(12) United States Patent
Berger et al.

(10) Patent No.: US 9,726,824 B1
(45) Date of Patent: Aug. 8, 2017

(54) OPTICAL CIRCUIT SWITCH COLLIMATOR

(71) Applicant: Google Inc., Mountain View, CA (US)

(72) Inventors: Jill D. Berger, Saratoga, CA (US);
David Funk, San Jose, CA (US);
Steven M. Swain, San Jose, CA (US);
Kevin Y. Yasumura, Lafayette, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/266,655

(22) Filed: Sep. 15, 2016

(51) Int. Cl.
*G02B 6/32* (2006.01)
*G02B 6/36* (2006.01)
*G02B 6/35* (2006.01)

(52) U.S. Cl.
CPC .............. *G02B 6/32* (2013.01); *G02B 6/3594* (2013.01); *G02B 6/3644* (2013.01)

(58) Field of Classification Search
CPC ....... G02B 6/32; G02B 6/3644; G02B 6/3594
See application file for complete search history.

(56) References Cited

U.S. PATENT DOCUMENTS

| | | | |
|---|---|---|---|
| 5,077,622 A | 12/1991 | Lynch et al. | |
| 6,219,484 B1 * | 4/2001 | Rhee ................... | G02B 6/3636 385/137 |
| 6,470,123 B1 * | 10/2002 | Sherman .............. | G02B 6/3835 385/115 |
| 6,483,071 B1 | 11/2002 | Hunter et al. | |
| 6,483,961 B1 * | 11/2002 | Helkey .................... | G02B 6/32 385/16 |
| 6,587,618 B2 * | 7/2003 | Raguin .................. | G02B 6/322 385/33 |
| 6,597,510 B2 | 7/2003 | Bunkenburg et al. | |
| 7,176,407 B2 | 2/2007 | Hunter et al. | |
| 7,424,183 B2 * | 9/2008 | Akashi ................. | G02B 6/2931 385/33 |
| 7,667,211 B2 * | 2/2010 | Takahashi .............. | A61B 1/043 250/458.1 |
| 8,162,656 B2 | 4/2012 | Jacobowitz et al. | |
| 8,355,609 B2 * | 1/2013 | Popp ........................ | G02B 6/32 385/26 |

(Continued)

FOREIGN PATENT DOCUMENTS

| | | |
|---|---|---|
| CN | 101408647 B | 1/2011 |
| JP | H07318860 A | 12/1995 |
| JP | H08152581 A | 6/1996 |

*Primary Examiner* — Ryan Lepisto
(74) *Attorney, Agent, or Firm* — McDermott Will & Emery LLP (57) ABSTRACT

A collimator device and a collimator lens array for an optical circuit switch are provided. The collimator includes a fiber array including multiple optical fibers disposed in a hole array. An optical lens array is aligned and coupled to the fiber array. A spacer is disposed between the fiber array and the optical lens array and provides substantially uniform spacing between lenses in the optical lens array and corresponding fibers in the fiber array. Multiple pads are positioned along edges of a surface of the spacer facing the optical lens array defining a first separation gap between the spacer and the optical lens array. A first epoxy bonds the spacer to the optical lens array, and a second epoxy bonds the spacer to the fiber array. The optical lens array includes a glass substrate having a first surface defining lenses in a two-dimensional array.

12 Claims, 9 Drawing Sheets

(56) References Cited

U.S. PATENT DOCUMENTS

| | | | |
|---|---|---|---|
| 9,063,313 B1* | 6/2015 | Hasharoni | G02B 6/43 |
| 9,529,155 B2* | 12/2016 | Bhagavatula | G02B 6/32 |
| 2001/0024548 A1 | 9/2001 | Hamanaka et al. | |
| 2002/0076151 A1* | 6/2002 | Kinard | G02B 6/32 385/33 |
| 2004/0047556 A1* | 3/2004 | Yasuda | G02B 6/32 385/33 |
| 2009/0057700 A1* | 3/2009 | Jin | H01L 33/20 257/98 |

* cited by examiner

OPTICAL CIRCUIT SWITCH COLLIMATOR

TECHNICAL FIELD

The present description relates generally to optical networks, and more particularly, but not exclusively, to optical circuit switch collimators.

BACKGROUND

Optical circuit switches (OCSs) are the heart of optical circuit switching networks. An OCS includes a number of optical collimators (e.g., passive collimators), which direct optical signals into and out of optical fibers coupled to the OCS. Example performance characteristics of a fiber collimator include insertion loss, constancy of beam waist diameter, location of the beam waist relative to the center of the OCS optical path, and degree of random beam pointing error. The existing OCS collimators using etched silicon or polymer lens arrays may not meet the desired performance characteristics.

SUMMARY

According to various aspects of the subject technology, a collimator device and a collimator lens array for an optical circuit switch are provided. According to one aspect of the subject technology, the collimator includes a fiber array including multiple optical fibers disposed in a hole array. An optical lens array is aligned and coupled to the fiber array. A spacer is disposed between the fiber array and the optical lens array and provides substantially uniform spacing between lenses in the optical lens array and corresponding fibers in the fiber array. Multiple pads are positioned along edges of a surface of the spacer facing the optical lens array thereby defining a first separation gap between the spacer and the optical lens array. A first epoxy couples the spacer to the optical lens array, and a second epoxy couples the spacer to the fiber array.

According to another aspect of the subject technology, the optical lens array includes a glass substrate having a first surface defining a number of lenses arranged in a two-dimensional array. The lenses are substantially identical and each has a respective radius of curvature that varies by no more than 1% from the radii of curvature of other lenses in the optical lens array. The lenses are uniformly arranged in the two-dimensional array with a pitch error of less than 1 micrometer (µm).

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Disclosed herein are a collimator device and a collimator lens array for an optical circuit switch. In one or more aspects of the subject technology, the collimator device includes a fiber array formed of a number of optical fibers disposed in a hole array. An optical lens array is aligned and optically coupled to the fiber array. A spacer is disposed between the fiber array and the optical lens array. The spacer provides refractive index matching to the optical fiber, and a uniform collimation distance between the optical lens array and the fiber array, enabling control of the beam waist size and position of a beam of the collimator device.

In some implementations, the optical lens array includes a number of substantially identical, suitably shaped molded glass lenses that are characterized by a surface figure error of less than 200 nanometers (nm). The glass lenses are uniformly arranged in the optical lens array with a pitch error of less than 1 micrometer (µm). The glass lenses have substantially identical radii of curvature, i.e., the radii of curvature of the glass lenses vary by no more than 1% across the lens array. A first epoxy layer may provide refractive index matching between the spacer and the optical lens array and a second epoxy layer may provide refractive index matching between the spacer and the optical fiber. The first and second epoxy bonds are uniformly distributed across first and second surfaces of the spacer as described in more detail herein.

Figure 1:
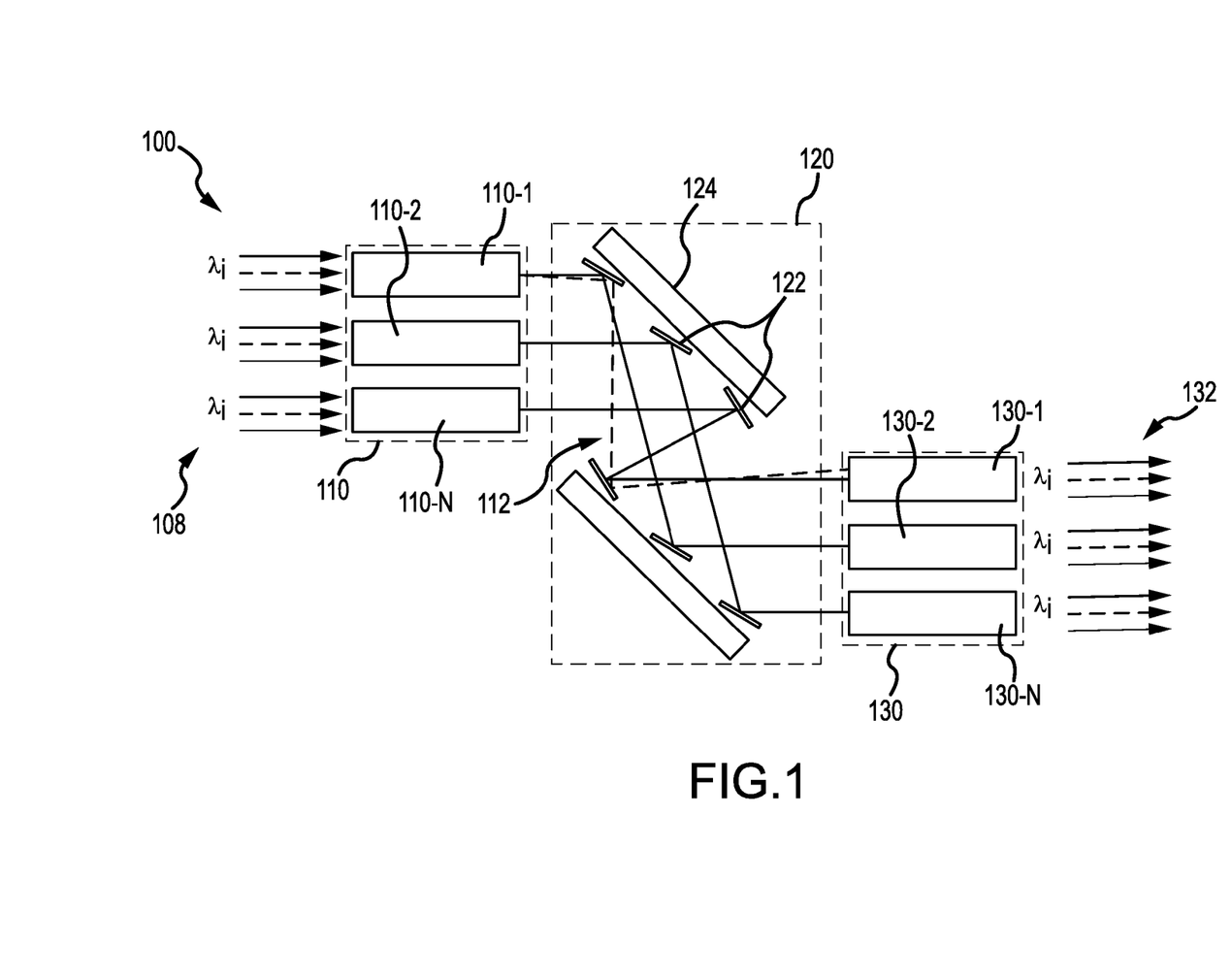
FIG. 1 is a diagram illustrating an example of an optical circuit switch (OCS), in accordance with one or more aspects of the subject technology.

FIG. 1 is a diagram illustrating an example of an optical circuit switch (OCS) 100, in accordance with one or more aspects of the subject technology. The OCS 100 is an all-optical switching matrix and includes input passive collimators 110 (e.g., 110-1, 110-2 . . . 110-N), a mirror array 120, and output passive collimators 130 (e.g., 130-1, 130-2 . . . 130-N). The input passive collimators 110 include multiple passive collimators that are coupled to a number N (e.g., in the range of about 128-1000) of optical fibers. Input light 108 enters the input passive collimators 110 through the optical fibers. The light transmitted through each optical fiber includes one or more optical wavelengths ($\lambda_i$). Output light 132 from the output passive collimators 130 is provided to a set of output optical fibers, each carrying light at the one or more optical wavelengths ($\lambda_i$). The collimators can be separate individual collimators or combined into a collimator array, as shown, for example, in FIG. 2A. The input and output passive collimators 110 and 130 are structurally similar and are described in more detail hereinafter. The mirror array 120 is a micro-electro-mechanical system (MEMS) based micro-mirror array that can selectively direct optical beams from individual optical fibers coupled to the input passive collimators 110 to selected optical fibers coupled to the output passive collimators 130. The MEMS-based micro-mirror array (hereinafter "MEMS array") 120 includes two sets of micro-mirror arrays each having a number of micro-mirrors 122 formed on a substrate 124. The state of each micro-mirror 122 can be controlled by applying a voltage between two electrodes associated with each mirror in the MEMS array 120. For example, by rotating the mirrors in the MEMS array 120, light from any input fiber coupled to the input passive collimators 110 can be coupled to any output fiber coupled to the output passive collimators 130. The dotted-line path 112 is a result of potential beam pointing error that can be corrected by a control system that controls the position of the individual mirrors of the MEMS array 120.

Figures 2A, 2B:
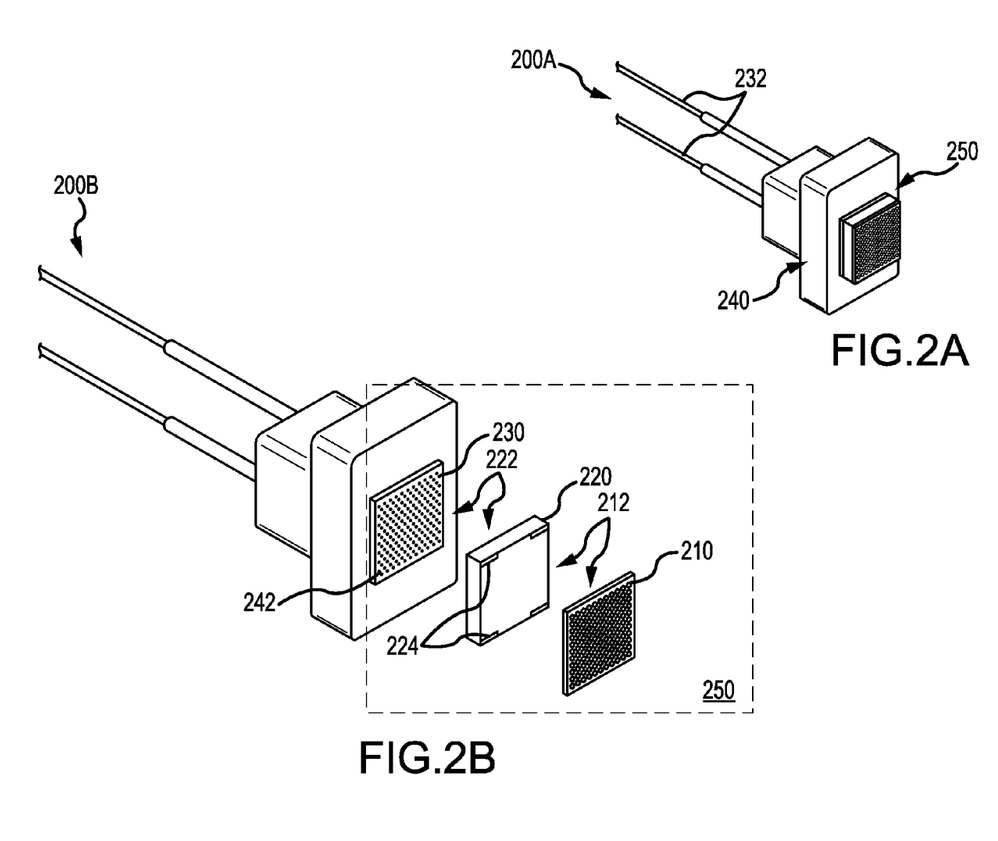
FIGS. 2A-2B are diagrams illustrating an example of an OCS collimator assembly and an exploded view of the same, in accordance with one or more aspects of the subject technology.

FIGS. 2A-2B are diagrams illustrating an example of an OCS collimator assembly 200A and an exploded view 200B of the same, in accordance with one or more aspects of the subject technology. The OCS collimator assembly 200A (hereinafter "collimator 200A") shown in FIG. 2A includes a collimator array 250, a mounting flange 240, and optical fibers 232. The flange 240 can be made of stainless steel, invar, or any other suitable material, and secures the collimator array 250 to the OCS assembly 200A. More detail of the collimator array 250 is shown in and described with respect to the exploded view 200B. The collimator array 250, as shown in the exploded view 200B, includes an optical lens array 210, a spacer 220, a fiber array 230, a hole array 242, a first epoxy 212, and a second epoxy 222. When used for the output collimators of an OCS, such as the output collimators 130 shown in FIG. 1, collimated input light beams enter from the free space to the optical lens array 210, and focused output light is coupled to the optical fibers 232 of the fiber array 230. When used for the input collimators of the OCS, such as the input collimators 110 shown in FIG. 1, the input light enters from the optical fibers 232 of the optical fiber array 230 and exits the optical lens array 210, as collimated output light beams to the MEMS array 120 shown in FIG. 1. The optical lens array 210 is a two-dimensional (2-D) micro-lens array that includes a number of (e.g., 150 to 200) suitably-shaped micro-lenses (also referred to as "lenslets"), and can be about 15×15 mm² to 25×25 mm². In some embodiments, the optical lens array 210 is fabricated (e.g., via molding) using glass, for example, a high refractive index glass, which has a refractive index of 1.78 at 1550 nm. In one or more embodiments, the lenslets are spherical with an effective focal length of about 3.38 mm and identical radii of curvature of about 2.63 mm that vary by no more than 1% across the lenslets of the optical lens array. In some embodiments, other values of radii of curvature and effective focal length may be used. The high-index glass allows for spherical lenses to be used without significant insertion loss penalty due to spherical aberration. The lens surface figure error can be less than 200 nm. This precision fabrication can result in an improved fiber coupling efficiency and a low insertion loss (e.g., <0.5 dB).

In one or more embodiments, optical lens array 210 is fabricated using a lens array mold that is micro-machined in a suitable material using a shaped (e.g., spherical) tip with a radius of curvature similar to the desired lens radius of curvature. In some implementations, the mold is re-machined in micron increments, and then re-measured after each machining attempt, to achieve the perfect (or near-perfect) spherical form of the lenslets to within <200 nm. Once the perfect (or near-perfect) form of the mold is achieved, the mold can be used to make many (e.g., several thousand) lens arrays. The glass is molded at a suitable temperature and post-processed. The post-processing includes adding antireflection coatings to the lenses, and dicing the edges to the final desired dimensions.

The spacer 220 can be a patterned spacer made of glass (e.g., Schott B33 glass) with surface dimensions matching the dimensions of the optical lens array 210 (e.g., ~20×20 mm) and a suitable thickness (e.g., 4 mm). The glass used for the spacer is selected for its refractive index to be well-matched (e.g., within less than 1%) to the doped core of the optical fibers (e.g., SMF28 type) of the fiber array 230. The spacer 220 includes a number of pads 224 made of a suitable material (e.g., silicon dioxide ($SiO_2$)/chromium (Cr)). The pads 224 set an even and controlled separation gap between the optical lens array 210 and the spacer 220. The pads 224 are lithographically patterned on the edges (e.g. corners) of a first surface of the spacer 220. In some embodiments, the pads 224 have dimensions of about 5×1 mm×5 um high. The material is deposited using chemical vapor deposition (CVD) or physical layer deposition (PLD) techniques known to persons of skill in the art to form a uniform thickness and are then etched to provide uniform height pads. The pads 224 can be created within the outer dimensions of the spacer 220 and optical lens array 210, but outside the clear aperture of the optical lens array 210, so as to not block the light propagating through the lenslets of the optical lens array 210. In some embodiments, the spacer glass is precision polished to a thickness tolerance of approximately +/−2 um. The first epoxy 212 is an optical path link-up epoxy and its refractive index is matched to the spacer 220 (within less than 2%). The first epoxy 212 couples the spacer 220 to the optical lens array 210. The second epoxy 222 couples the spacer 220 to the fiber array 230 with optical fibers that have a core refractive index of about 1.468 at 1550 nm.

In some embodiments, the collimator assembly 200A can be made of up to 176 optical fibers secured in the holes of the hole array 242 that collectively form the fiber array 230. The optical fibers 232 can be single-mode fibers (e.g., SMF28) that are assembled in the hole array (e.g., made of silicon, glass, or metal), such that the arrangement of the holes matches the geometrical arrangement of the lenses of the optical lens array 210 that in turn matches the geometrical arrangement of the MEMS array 120 of FIG. 1. The collimator array 250 is attached to the mounting flange 240.

FIGS. 3A through 3D are diagrams illustrating an example of a fiber collimator 300A, a front view 300B of the collimator array 250 included in the fiber collimator 300A, a molded glass optical lens array 300C, and light collimation through a molded glass lens 332 and a spacer 370, in accordance with one or more aspects of the subject technology. The fiber collimator 300A of FIG. 3A includes the optical fibers 232, the mounting flange 240 and a collimator array 250. The optical fibers 232 can be single mode such as SMF28 optical fibers and are assembled in the hole array discussed above and are attached to the mounting flange 240. The optical fibers 232 can be made of any desired length to suit an application in an all-optical or hybrid opto-electric network. The collimator array 250 includes the optical lens array 210, the spacer 220, the first and second epoxy 212 and 222, and the fiber array 230 mounted in the hole array 242, all shown in FIG. 2B, discussed above.

Figure 3A:
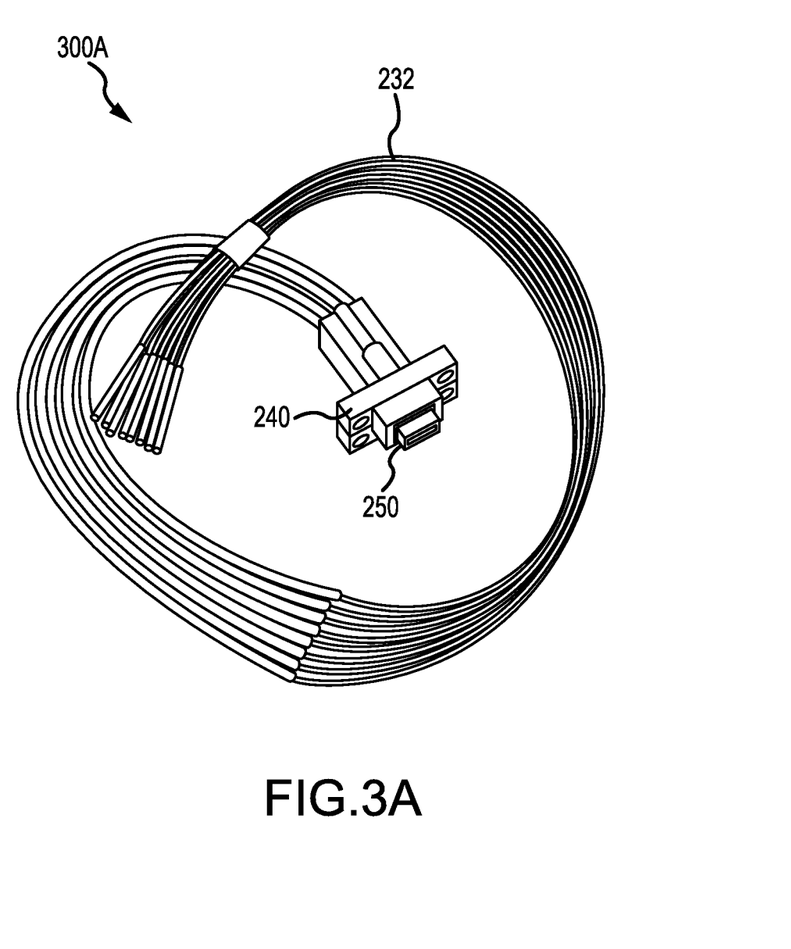
FIGS. 3A through 3D are diagrams illustrating an example of a fiber collimator, a front view of the collimator array included in the fiber collimator, a molded glass optical lens array, and light collimation through a molded glass lens and a spacer, in accordance with one or more aspects of the subject technology.
Figure 3B:
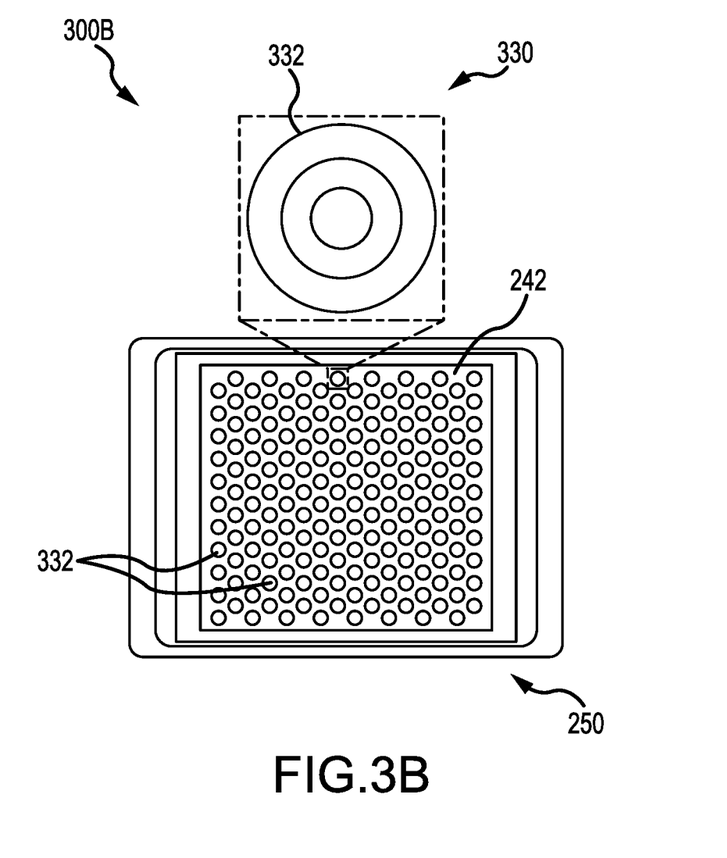

The collimator array 250 shown in the front view 300B of FIG. 3B includes the optical lens array 210 coupled to the spacer (e.g., 220 of FIG. 2) using the first epoxy 212 and via the second epoxy 222 to the fiber array 230, which is in turn secured to the hole array 242. The optical lens array 210, as shown includes a number of (e.g., 176) lenslets 332. An example lenslet 332 is also shown in the exploded view 330. The lenslets 332 are aligned to the fibers of the fiber array 230. The alignment and attachment of the lens array 210 with the fiber array 230 is performed using an automated lens alignment robot having, for example, six degrees of freedom, 50 nm step size on the linear stages, and 7 urad step size on the rotation stages. The lens alignment robot can use a precision contact sensor to set a uniform gap height between a second (e.g., distal from the lens-array) surface of the spacer 220 and a first (e.g., proximal to the hole array) surface of the fiber array 230. In some embodiments, the precision contact sensor can be used to co-planarize the two surfaces, and then set a constant 15 um gap height between them.

In one or more embodiments, the optical lens array 210 is aligned to the fiber array 230 using an optical feedback system based on measuring fiber coupling efficiency of a number of (e.g., 30-35) fibers in the upper and lower rows of the fiber array to improve the horizontal, vertical, and rotational alignment of the optical lens array 210 with respect to the fiber array 230. Finally, optical path link up epoxy (e.g., epoxy 222 of FIG. 2B) is applied between the two surfaces. The 15 um bond line is re-set using the contact sensor, and the epoxy is UV cured and then thermally cured to complete the assembly. In some embodiments, the collimator assembly (e.g., 200A of FIG. 2A) has a beam waist position set at a desired distance (e.g. at approximately 110 mm) from the optical lens array 210, and a beam waist (e.g., a 1/e$^2$ of the maximum beam width) diameter of approximately 400 um, measured at 1550 nm wavelength. The constant beam waist size and position at the center of an optical path across the mirror array of the OCS 100 of FIG. 1 provides improved fiber coupling efficiency and low insertion loss (e.g., <0.5 dB) between the two collimators (e.g., 110 and 130 of FIG. 1) in the OCS 100 for all or nearly all possible port connections.

Figure 3C:
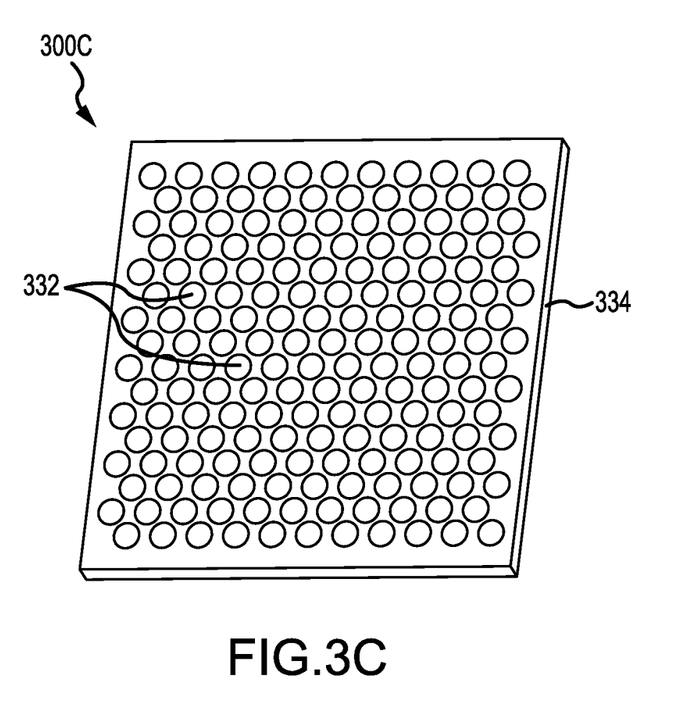

The molded glass optical lens array 300C shown in FIG. 3C includes a number of (e.g., 176) suitably shaped lenslets 332 arranged in a 2-D array. The lenslets 332 are formed to protrude from a substrate 334. In some embodiments, the 2-D lens array 300C is about 20×20 mm square and is fabricated in glass, which has a high refractive index (e.g., ~1.78 at 1550 nm). In some embodiments, the lenslets 332 are spherical with identical radii of curvature (e.g., within 1%) of approximately 2.63 mm and an effective focal length of approximately 3.38 mm. In some embodiments, the radii of curvature and the effective focal length of the lenslets 332 can have other values. The high refractive index glass allows for spherical lenses to be used without significant insertion loss penalty due to spherical aberration. A measured lens surface figure error of <200 nm is an indication of a precision fabrication, which results in the optimal fiber coupling efficiency and the substantially low insertion loss discussed below. The surface figure error is an integral value of errors between a desired (e.g., spherical) shape and the actual shape of a lens at a number of measured points on the surface of the lens. The surface figure error can be measured via interferometry using an interference microscope such as an optical profiler.

Figure 3D:
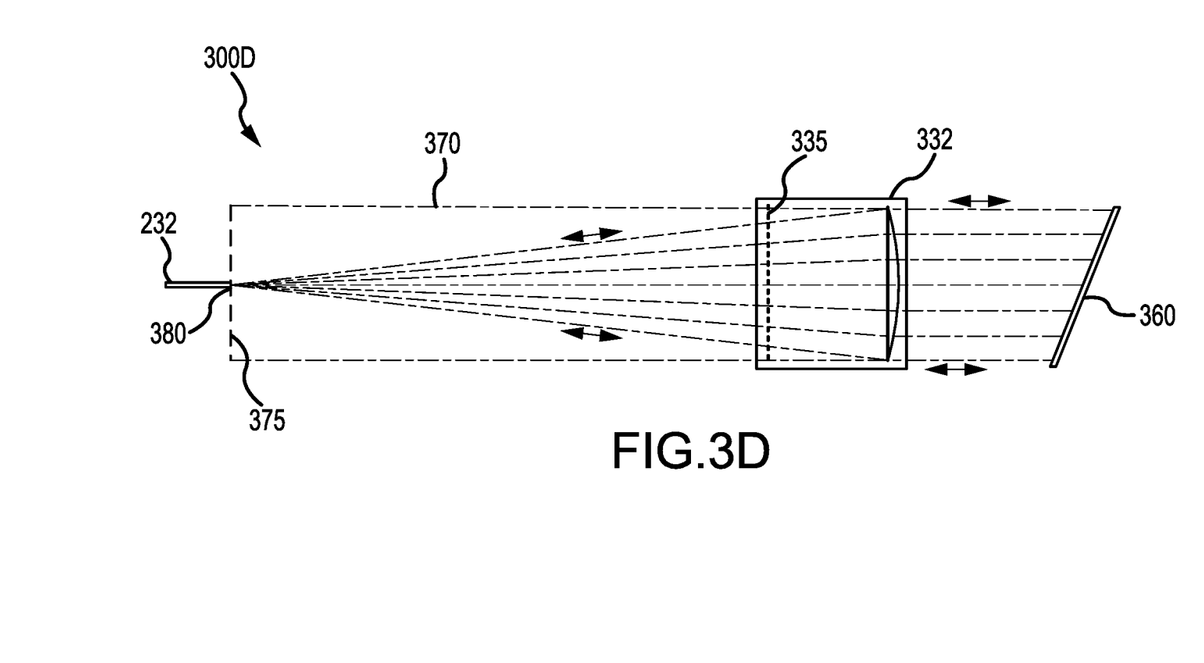

The light collimation through a spacer 370 and a molded glass lens 322 of the optical lens array 300C are shown in FIG. 3D. In case of the collimator 110 such as 110-1 of FIG. 1, an optical light beam from an end-point 380 of a fiber 232 can be collimated through an optical path formed by a spacer 370 and the lenslet 332 coupled via an epoxy layer 335. The collimated light is a parallel beam that is reflected from a mirror 360 of a MEMS array (e.g., 120 shown in FIG. 1). In case of the collimator 130 such as 130-1 of FIG. 1, the light can be reflected from the mirror 360, then enter the lenslet 322 as a parallel beam and be focused, via the optical path through the lenslet 332, a first epoxy 335, the spacer 370, and a second epoxy 375 to the end-point 380 of the optical fiber 232.

Figure 4:
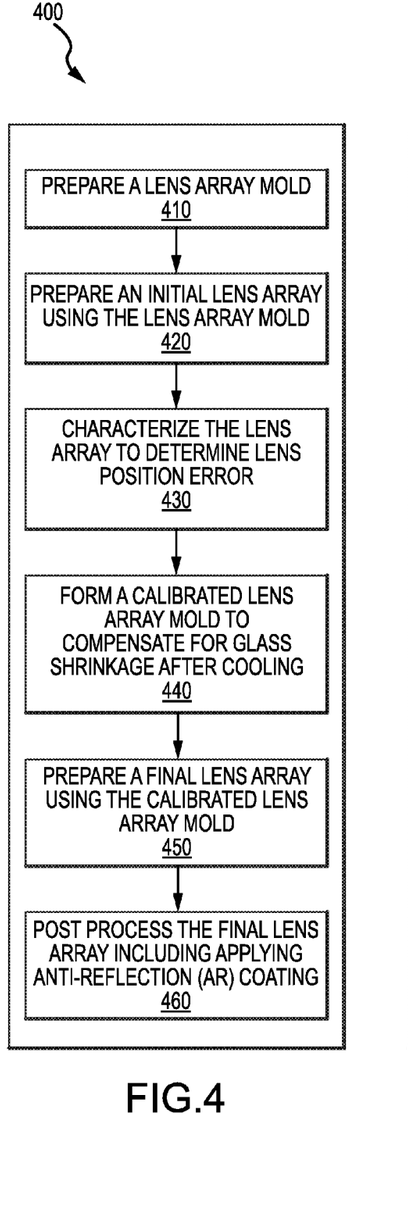
FIG. 4 is a flow diagram illustrating an example method of manufacturing the molded glass optical lens array of FIG. 3C, in accordance with one or more aspects of the subject technology.

FIG. 4 is a flow diagram illustrating an example method 400 of manufacturing the molded glass optical lens array of FIG. 3C, in accordance with one or more aspects of the subject technology. The method 400 begins with preparing the lens array mold (step 410). The lens array mold is micro-machined in a suitable material using a shaped (e.g., spherical) tip, having a radius of curvature similar to the desired lens radius of curvature. In some embodiments, the mold is re-machined in micron increments, and then re-measured after each machining attempt, to achieve the perfect or near-perfect desired form of the lenslets, for example, to within <200 nm.

The glass is molded at a suitable temperature and the initial lens array is formed using the lens array mold (step 420). The lens position accuracy of the desired lens array (e.g., 300C of FIG. 3C) is maintained within a desired position accuracy (e.g., <+/−1 um) with respect to the absolute position of each lens on the lens array. To achieve the desired position accuracy, the mold is machined to compensate for the shrinkage of the glass when it cools. The formed initial lens array is characterized to determine a lens position error (step 430). In some embodiments, the characterization is performed using an automated alignment robot with 50 nm step size to determine the lens position error caused by the glass shrinkage. A calibrated lens array mold is prepared (e.g., by adjusting the mold or creating a new one) to compensate for glass shrinkage after cooling (step 440). For example, the mold can be machined with an adjusted lens pitch that compensates for the glass shrinkage factor. In one or more embodiments, measuring the lens array and then calibrating the mold for the glass shrinkage can be performed using available metrology tools such as a surface profilometer, with for example, an error of <1 um in 20 mm (0.005%).

The final lens array is prepared using the calibrated lens array mold (step 450) and using a suitable high-index glass. The final lens array is then post processed (step 460). The post-processing includes adding AR coatings to the lenses as described above, and dicing the edges to the final desired dimensions.

Figure 5:
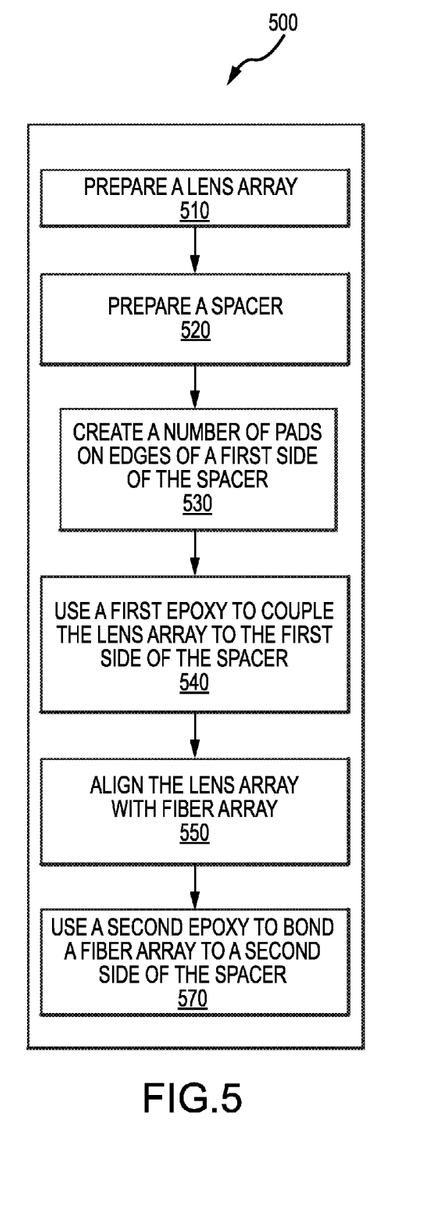
FIG. 5 is a flow diagram illustrating an example method of manufacturing the OCS collimator device of FIG. 2, in accordance with one or more aspects of the subject technology.

FIG. 5 is a flow diagram illustrating an example method 500 of manufacturing the OCS collimator assembly 200A of FIG. 2A, in accordance with one or more aspects of the subject technology. The method 500 begins with preparing a lens array (step 510), for example, the lens array 300C of FIG. 3C, according to the method 400 described above with respect to FIG. 4. The collimator assembly 200A also includes a spacer (e.g., 220 of FIG. 2B), which is prepared (step 520) using a suitable glass (e.g., Schott B33) that is selected for its suitable refractive index (e.g., 1.456 at 1550 nm). The spacer maintains a collimation distance between the optical lens array (e.g., 210 of FIG. 2B) and the fiber array (e.g., 230 of FIG. 2B) and enables control of the beam waist size and the beam waist location of the beam of the collimator assembly 200 of FIG. 2A. Prior to the spacer being bonded to the fiber array, a number of pads are created on the spacer (step 530) by lithographically patterning a layer of a suitable material (e.g., SiO2/Cr) on edges (e.g. corners) of a first side of the spacer. The pads are positioned within the outer dimensions of the spacer 220 and the optical lens array 210 of FIG. 2B, outside a clear aperture of the lens array, so that they do not block the light propagating through the lenslets. In some embodiments, the spacer glass is precision polished to a thickness tolerance of approximately +/−2 um.

A layer of the first epoxy (e.g., 212 of FIG. 2B) is used (step 540) to bond the lens array to the first side of the spacer. The first epoxy 212 is index matched (to within less than 2%) to the spacer. In some embodiments, the first epoxy 212 has a refractive index value that is about halfway between a value of the refractive index of the spacer (e.g., about 1.456) and the refractive index of the glass material of the lens array (e.g., about 1.78). In one or more embodiments, the spacer is placed in a tooling fixture, a controlled amount of the first epoxy is dispensed to the first side of the spacer, then the lens array is placed on the dispensed epoxy, and a weight is set on top of the tooling fixture to press the first epoxy between the lens array and the spacer. The epoxy is UV cured and then thermally cured to complete the attachment. The lens-spacer assembly is then aligned (at step 550) with the fiber array 230, as described above with respect to FIG. 3B, using an automated lens alignment robot having, for example, six degrees of freedom, 50 nm step size on the linear stages, and 7 urad step size on the rotation stages. The lens alignment robot can use a precision contact sensor to set a uniform gap height between the second surface of the spacer and the first surface of the fiber array 230. In some embodiments, the precision contact sensor can be used to co-planarize the two surfaces, and then set a constant 15 um gap height between them. A second epoxy layer (e.g., 224 of FIG. 2B) is used (step 570) to bond the second side of the spacer to the fiber array (e.g., 230 of FIG. 2B).

Figure 6:
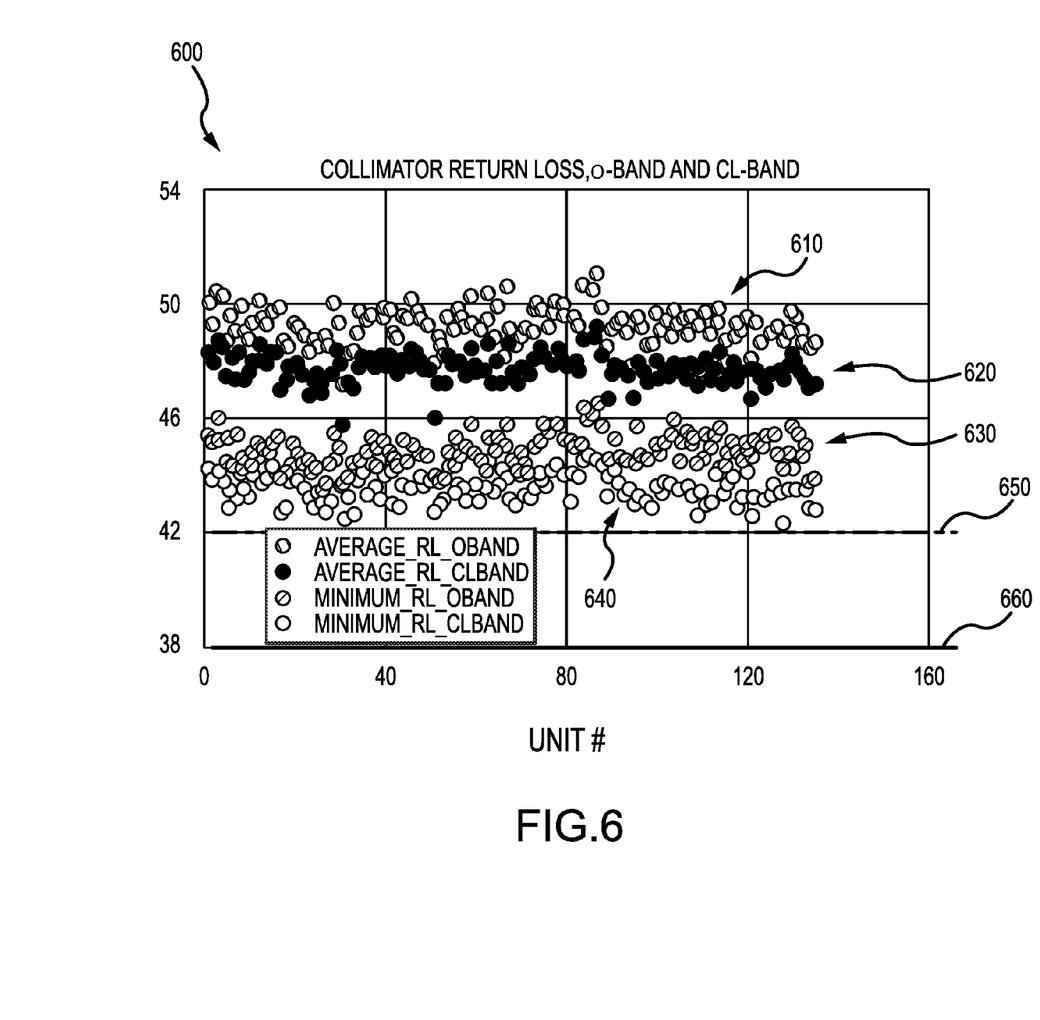
FIG. 6 is a diagram illustrating an example chart of the return loss of the collimator of FIG. 2, in accordance with one or more aspects of the subject technology.

FIG. 6 is a diagram illustrating an example chart 600 of return loss of the OCS collimator 200 of FIG. 2, in accordance with one or more aspects of the subject technology. The chart 600 shows variation of return loss (RL, in dB) for a number of (e.g., 176) fibers (e.g., collimators such as 110-1 or 130-1 of FIG. 1) of the collimators 110 or 130 of FIG. 1, each unit including an optical path between a lenslet of the optical lens array 210 and a respective optical fiber of the fiber array 230 shown in FIG. 2B. The plots 610, 620, 630 and 640 respectively correspond to average RL values for light in the O-band (1270-1360 nm) and CL-band (1530-1620 nm) and minimum RL values for the light in the O-band and the CL-band. The collimator of the subject technology uses the second epoxy (e.g., 222 of FIG. 2) having an epoxy refractive index for reduced return loss at the optical fiber-spacer interface, and an anti-reflection (AR) coating on the plano side of the lens array As described above, in some embodiments, the fiber array is made of SMF28 Ultra fiber with a refractive index of 1.468 at 1550 nm, while the lens array is made of a glass with a refractive index of 1.78 at 1550 nm. The fiber array 230 and the optical lens array 210 are separated by a glass spacer that positions the lens array at the required distance from the fiber array for beam collimation, and also provides a refractive index matching solution. The spacer is made of Schott B33 glass with a refractive index of 1.456 at 1550 nm. The second epoxy has a refractive index of 1.462 that is almost halfway between the refractive index of the spacer (e.g., about 1.456) and the refractive index of the optical core of the optical fiber (e.g., about 1.468) and can reduce the return loss at the spacer-fiber interface. Further, the disclosed collimator utilizes an AR coating designed for the lens substrate (e.g., 334 of FIG. 3) at the lens-spacer interface that is selected to reduce return loss from constructive interference in the spacer layer.

In some embodiments, the epoxy (e.g., first and second epoxy) refractive index is adjustable, and can be optimized for minimum return loss of the fiber-epoxy-spacer interface, as shown in thin film transfer matrix calculations. It is understood that the optimization occurs when the epoxy refractive index results in equal reflectance (R) values at the fiber-epoxy interface and the epoxy-spacer interface, where $R=((n_{epoxy}-n_{fiber})/(n_{epoxy}+n_{fiber}))^2=((n_{epoxy}-n_{spacer})/(n_{epoxy}+n_{spacer}))^2$. The applied model includes dispersion for the example optical fiber (e.g., SMF28 Ultra fiber with $n_{fiber}=1.468$), epoxy (e.g., an epoxy with $n_{epoxy}=1.462$), and spacer (e.g., the Schott B33 spacer with $n_{spacer}$ 1.456). The optical lens flat side (e.g., second surface) AR coating can be determined for the example substrate (e.g., a glass with n=1.78) and the spacer (e.g., Schott B33 with $n_{spacer}=1.456$) incident medium, using the example epoxy (e.g., an epoxy layer with $n_{epoxy}=1.462$). The fiber coupling efficiency of a reflection from the lens-epoxy-spacer interface back into the fiber is approximately −32.4 dB. This is added to the Fresnel reflectance to produce the total return loss from this interface.

The collimator return loss is characterized by sweeping a tunable laser from 1270 to 1360 nm (O-band) or 1530-1620 nm (CL-band) with 10 pm resolution, and measuring the return loss oscillations. Then, the average and minimum RL values over the O-band and CL-band for each optical fiber are determined, as shown in the plots 610, 620, 630, and 640. In some embodiments, the fiber ports that do not meet the return loss specifications can be eliminated. In one or more embodiments, an optical backscatter reflectometer is used to spatially locate regions of higher return loss in the collimator.

Figure 7:
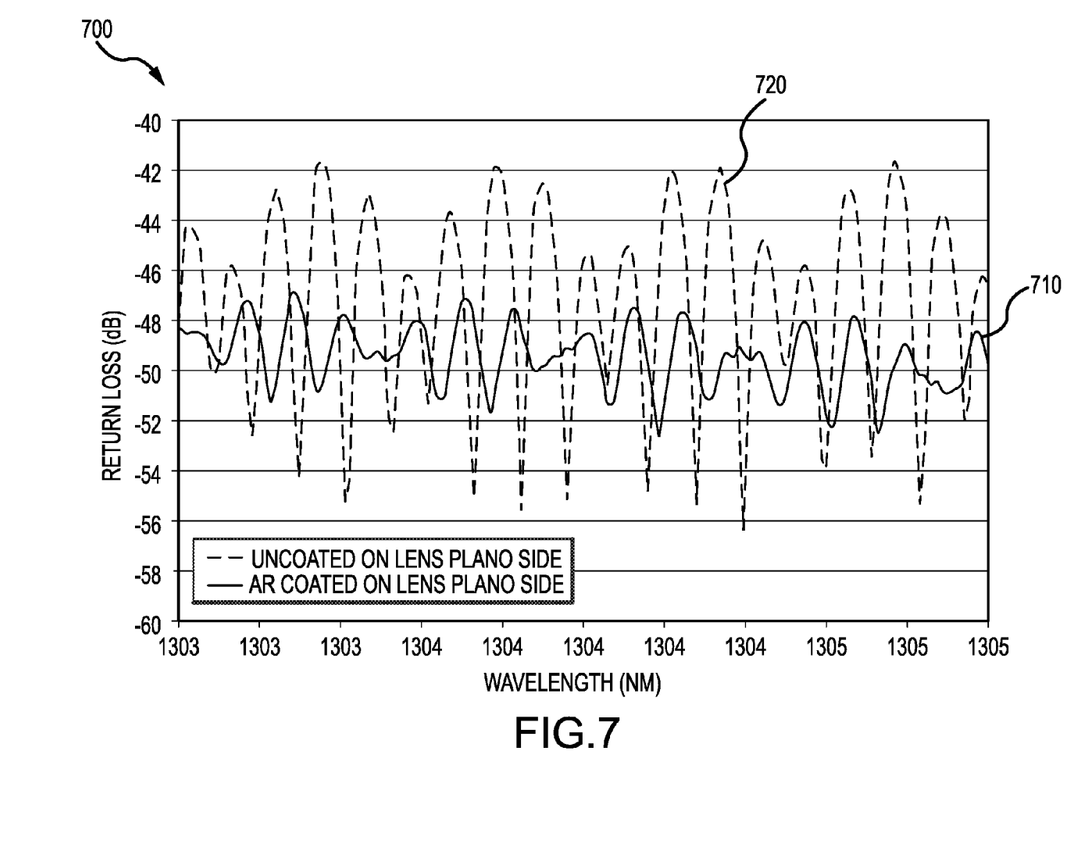
FIG. 7 is a diagram illustrating an example chart of the return loss of the collimator of FIG. 2, with and without an anti-reflection (AR) coating, in accordance with one or more aspects of the subject technology.

FIG. 7 is a diagram illustrating an example chart 700 of return loss of the OCS collimator of FIG. 2, with and without an anti-reflection (AR) coating. The chart 700 includes plots 710 and 720 corresponding to lenses with and without AR coating. The return loss values are given in dB and for a number of wavelengths in the O-band.

Measurement results show that there is a slow return loss oscillation due to constructive interference in the epoxy layer, with a period of 38 nm that is set by the 15 um thickness of the epoxy layer. There is also a fast return loss oscillation due to constructive interference in the spacer layer, with a period of 0.11 nm (as shown for fast oscillations of plot 720) that is determined by the thickness of the spacer (in this example 4.146 mm). These oscillations are superimposed.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. An optical circuit switch collimator device, the device comprising:
   a fiber array comprising a plurality of optical fibers disposed in a hole array;
   an optical lens array aligned and coupled to the fiber array;
   a spacer disposed between the fiber array and the optical lens array and configured to provide substantially uniform spacing between lenses in the optical lens array and corresponding fibers in the fiber array;
   a plurality of pads positioned along edges of a surface of the spacer facing the optical lens array and defining a first separation gap between the spacer and the optical lens array;
   a first epoxy coupling the spacer to the optical lens array; and
   a second epoxy coupling the spacer to the fiber array.

2. The device of claim 1, wherein the optical lens array includes a plurality of substantially identical glass lenses characterized by a surface figure error of less than 200 nano-meter (nm).

3. The device of claim 2, wherein the plurality of substantially identical glass lenses are uniformly arranged in the optical lens array with a pitch error of less than 1 micrometer (μm).

4. The device of claim 2, wherein the plurality of substantially identical glass lenses comprise spherical lenses.

5. The device of claim 1, wherein lenses in the optical lens array have respective radii of curvature that vary by no more than 1% from the radii of curvature of other lenses in the optical lens array.

6. The device of claim 1, wherein the first epoxy has a first refractive index value about halfway between a value of respective refractive indices of the spacer and a glass material of the lens array.

7. The device of claim 1, wherein the second epoxy has a second refractive index value about halfway between a value of a refractive index of the spacer and a value of a refractive index of optical cores of the plurality of optical fibers of the fiber array.

8. The device of claim 1, wherein a first surface of the optical lens array is coated with a first anti-reflection (AR) coating configured to prevent reflections at a lens-spacer interface of the first surface of the optical lens array and the spacer, wherein the first surface faces the spacer, and wherein the first epoxy has a first refractive index value equal to a value of respective refractive indices of the spacer, and wherein a second surface of the optical lens array is coated with a second AR coating configured to prevent reflections at a lens-air interface.

9. The device of claim 1, wherein the refractive indexes of the optical lens array, the spacer, the first epoxy, the second epoxy, and the optical fiber are approximately 1.78, 1.456, 1.462, 1.462, and 1.468, respectively, at an optical wavelength of about 1550 nm.

10. The device of claim 1, wherein the first separation gap is about 5 μm.

11. The device of claim 1, wherein the spacer is further configured to maintain a collimation distance between the optical lens array and the fiber array and to enable control of a beam waist size and a beam waist position of a beam of the device.

12. The device of claim 1, wherein the hole array includes a material comprising at least one of silicon, glass, or metal.

* * * * *